United States Patent Office 3,125,599
Patented Mar. 17, 1964

3,125,599
POLYMERS OF FLUOROCARBON EPOXIDES
Joseph Leo Warnell, Wilmington, Del., assignor to E. I. du Pont de Nemours and Company, Wilmington, Del., a corporation of Delaware
No Drawing. Filed June 15, 1961, Ser. No. 117,300
8 Claims. (Cl. 260—535)

The present invention relates to a method of polymerizing tetrafluoroethylene epoxide and to novel tetrafluoroethylene epoxide polyethers prepared by such methods.

It is an object of the present invention to provide a process for the polymerization of tetrafluoroethylene epoxide. Another object is to provide useful tetrafluoroethylene epoxide polymers. Other objects will become apparent hereinafter.

The objects of this invention are accomplished by a process which comprises contacting tetrafluoroethylene epoxide at a temperature of —80 to +40° C. with an activated charcoal catalyst and recovering the resulting tetrafluoroethylene epoxide polyether.

Tetrafluoroethylene epoxide is prepared by the oxidation of tetrafluoroethylene with molecular oxygen, in the presence of a free radical source such as actinic radiation or a free radical producing compound such as a halogen and, in particular, bromine. A practical illustration of the described process is as follows: a mixture of gases, air, 1.0 l./min., oxygen, 130 ml./min., bromine (0.3% in 99.7% $N_2$), 15 to 20 ml./min., and tetrafluoroethylene 300 ml./min., was charged into an actinic irradiation reactor using quartz tubes placed 2 cm. from an ultraviolet light source, a General Electric photochemical lamp 1200 U 11. The reactor lamp temperature was maintained at 200 to 310° C. and the reactor at 135 to 150° C. The emerging gas stream was condensed in a liquid nitrogen trap and tetrafluoroethylene epoxide, B.P. —63.5°±1° C. was obtained by fractional distillation from the condensate.

The catalyst employed comprises activated charcoal which is well known in the art. Activation of charcoal is achieved by heating at elevated temperatures, such as 400° C., in an inert atmosphere or by heating the charcoal in a vacuum. The quantity of catalyst is not critical since the polymerization is a solid-gas or solid-liquid reaction. Thus, large quantities of the catalyst polymerize the tetrafluoroethylene epoxide to polymers of substantially the same molecular weight as small quantities. The polymerization pressure is not critical and can vary from subatmospheric pressure, e.g., 0.1 atmosphere, to many thousand atmospheres, e.g., 5000 atmospheres.

The tetrafluoroethylene epoxide polyethers obtained by the process of the present invention have the general formula $$CF_3—CF_2—O—(CF_2—CF_2—O)_n—CF_2—CFO$$

where $n+2$ is the degree of polymerization and $n$ represents the number of —$CF_2$—$CF_2$—O— groups in the polymer. The degree of polymerization can vary from two ($n=0$) in which case the formula results in the dimer, to numbers of 50 to 100 and greater, the latter products being solid polyethers of tetrafluoroethylene epoxide. The tetrafluoroethylene epoxide polyethers prepared by the process of the present invention, in general, contain at least one acid fluoride end group. The acid fluoride end group is readily converted to the carboxylic acid group by contact with water. Both the acid and the acid fluorides react with bases and other compounds to result in acyl derivatives in accordance with reaction mechanisms which have been established for fluorocarbon acids. Acylate radicals which combine with a fluorocarbon acyl radical and, hence, with the perfluoropolyether acyl radicals are well known as are the methods by which the acyl radical and the acylate radicals combine to form acyl derivatives.

The invention is further illustrated by the following examples.

Example I

Into a 50 ml. stainless steel cylinder, cooled to —80° C., was charged 1 g. of "Darco" 12 x 20 activated charcoal. The reaction vessel was evacuated and tetrafluoroethylene epoxide, 5.5 g., was injected into the vessel and allowed to polymerize for a period of 25 hours while the temperature was maintained between —80° C. and —45° C. Upon completion of the reaction, as indicated by pressure change, the gases were vented off. The reaction product was treated with perfluorodimethylcyclobutane which dissolved the tetrafluoroethylene epoxide polyethers. On filtration, the filtrate was distilled to recover the polyether. A 95% conversion to polyether was obtained. The polyethers obtained were analyzed as to their infrared spectrum and their nuclear magnetic resonance spectrum which confirmed the structure

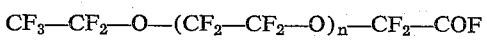

Distillation of product obtained from several polymerizations using the described procedure yielded several fractions: a fraction boiling from 80 to 130° C. at a pressure of 0.3 mm. Hg, M.P. —25 to —21° C., corresponding to an average molecular weight of 600; a second fraction boiling from 130° C. to 200° C. at 0.3 mm. Hg pressure, M.P. +7 to +9° C., corresponding to an average molecular weight of 1000; a third fraction boiling from 220° C. to 310° C. at 0.3 mm. Hg pressure, M.P. +15 to +17° C., corresponding to an average molecular weight of 2550; and a residue boiling above 300° C. at 0.3 mm. Hg pressure, M.P. 39 to 41° C., corresponding to an average molecular weight of 4700. Molecular weight determinations were carried out by titrating the polyether with aqueous NaOH in a mixed solvent system of perfluorodimethylcyclobutane, methanol and water. In view of the difficulty in accurately determining endpoints, the accuracy of the molecular weights listed is only fair.

A sample of the tetrafluoroethylene epoxide polyether having a boiling point of 220° C. to 300° C. at 0.3 mm. Hg pressure was heated in dry nitrogen to a temperature of 500° C. without significant decomposition indicating the remarkable thermal stability of the polymer.

Example II

Tetrafluoroethylene epoxide was polymerized using the above described procedure with 12 g. of the epoxide and 1.3 g. of "Darco" 12 x 20 charcoal. The polymerization time was 44 hours and the polymerization temperature was maintained between —52° and —30° C. On separation and distillation there was obtained 3.7 g. of a fraction consisting of perfluoroethoxyacetyl fluoride,

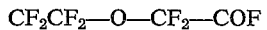

having a B.P. at 0 to +6° C., perfluoro-(2'-perfluoroethoxy)ethoxyacetyl fluoride, the trimer of tetrafluoroethylene epoxide,

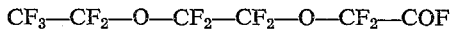

having a boiling point at 62 to 66° C. and the tetramer of tetrafluoroethylene epoxide,

B.P. 96–100° C., as well as 3 g. of higher molecular weight polyethers.

A portion of the trimer of tetrafluoroethylene epoxide was treated with methanol which converted the acid fluoride to the methyl ester of the trimer. On treatment of the trimer with a mixture of ice and an ammonium hydroxide solution the amide was formed.

A solution of the trimer in perfluorodimethylcyclobutane when contacted with water resulted in the formation of the corresponding acid, $$CF_3—CF_2—O—CF_2—CF_2—O—CF_2—COOH$$

and when contacted with an aqueous sodium hydroxide solution resulted in the formation of the sodium salt of the described acid. Solution of small quantities of the acid or the sodium salt of the acid in water caused a substantial decrease of the surface tension which demonstrates utility as surfactants and dispersing agents. The potassium salt is obtained in a similar way by treatment with potassium hydroxide. The magnesium salt is obtained by treatment with magnesium carbonate. The alkali and the alkaline earth metal salts and the ammonium salts are particularly useful as surfactants and dispersing agents. The amide of the trimer was also obtained by bubbling ammonia through a solution of the trimer in perfluorodimethylcyclobutane. The methyl amine salt was formed by bubbling methyl amine through the described trimer solution.

Surprisingly it was found that the high molecular weight polyethers of the present invention as well as the low molecular weight ethers are extremely soluble in perfluorocarbon solvents. This is contrary to the behavior of fluorocarbon polymers such as polytetrafluoroethylene of the same molecular weight which are only slightly soluble in perfluorocarbon solvents and also contrary to the behavior of hydrocarbon polyethers, the solution properties of which are analogous to the solution properties of straight hydrocarbon polymers of similar molecular weight. Therefore, even the high molecular weight polyethers of the present invention can be readily reacted and converted into the described acyl derivatives.

The tetrafluoroethylene epoxide polyethers of the present invention are useful as surfactants when converted into the form of a salt of the acid. In unmodified form, the polyethers are useful as high temperature lubricants, hydraulic fluids and the like.

I claim:
1. A polyether of tetrafluoroethylene epoxide having the general formula

$$CF_3—CF_2—O—(CF_2—CF_2—O)_n—CF_2—COX$$

where $n$ is a positive integer from zero to 50 and represents the number of $—CF_2—CF_2—O—$ groups in the chain, and X is a radical selected from the class consisting of fluorine, hydroxyl, amino and methoxy radicals.

2. A polyether of tetrafluoroethylene epoxide as set forth in claim 1 wherein X is a fluorine radical.

3. A polyether of tetrafluoroethylene epoxide as set forth in claim 1 wherein X is a hydroxyl radical.

4. The dimer of tetrafluoroethylene epoxide, perfluoroethoxyacetyl fluoride.

5. The trimer of tetrafluoroethylene epoxide having the general formula $$CF_3—CF_2—O—CF_2—CF_2—O—CF_2—COX$$

where X is a radical selected from the class consisting of the fluorine, hydroxyl, amino and methoxy radicals.

6. The tetramer of tetrafluoroethylene epoxide having the general formula $$CF_3—CF_2—O—CF_2—CF_2—O\\—CF_2—CF_2—O—CF_2—COX$$

where X is a radical selected from the class consisting of the fluorine, hydroxyl, amino and methoxy radicals.

7. A process for producing tetrafluoroethylene epoxide polyethers, which comprises contacting tetrafluoroethylene epoxide at a temperature of $-80$ to $+40°$ C. with activated charcoal and recovering a polymer of tetrafluoroethylene epoxide.

8. The process as set forth in claim 7 wherein the tetrafluoroethylene epoxide is maintained in the liquid state.

References Cited in the file of this patent
UNITED STATES PATENTS

| | | |
|---|---|---|
| 2,549,892 | Chaney | Apr. 24, 1951 |
| 2,713,593 | Brice et al. | July 19, 1955 |
| 2,769,838 | Matter et al. | Nov. 6, 1956 |
| 2,922,816 | Bruce | Jan. 26, 1960 |